(12) United States Patent
Masarwa

(10) Patent No.: US 7,900,656 B2
(45) Date of Patent: Mar. 8, 2011

(54) CROSS-LAMINATED PIPE AND METHOD OF MANUFACTURING SAME

(75) Inventor: Abed Masarwa, Taybi (IL)

(73) Assignee: Netafim, Ltd., Tel Aviv (IL)

( * ) Notice: Subject to any disclaimer, the term of this patent is extended or adjusted under 35 U.S.C. 154(b) by 248 days.

(21) Appl. No.: 12/166,346

(22) Filed: Jul. 2, 2008

(65) Prior Publication Data

US 2009/0065084 A1 Mar. 12, 2009

(30) Foreign Application Priority Data

Sep. 12, 2007 (GB) .................................. 0717679.5

(51) Int. Cl.
*F16L 11/00* (2006.01)
(52) U.S. Cl. ......... 138/123; 138/124; 138/137; 138/140; 138/141
(58) Field of Classification Search .................. 138/130, 138/129, 125, 137, 140, 156, 128
See application file for complete search history.

(56) References Cited

U.S. PATENT DOCUMENTS

| | | | | |
|---|---|---|---|---|
| 3,091,262 A | * | 5/1963 | Donaldson | 428/34.5 |
| 3,921,674 A | * | 11/1975 | Logan et al. | 138/130 |
| 4,173,670 A | * | 11/1979 | VanAuken | 138/123 |
| 4,181,157 A | * | 1/1980 | DeCamp | 138/126 |
| 4,266,579 A | * | 5/1981 | Deiss | 138/127 |
| 4,478,661 A | * | 10/1984 | Lewis | 156/92 |
| 4,900,596 A | * | 2/1990 | Peacock | 428/34.5 |
| 4,929,478 A | * | 5/1990 | Conaghan et al. | 428/35.1 |
| 5,613,522 A | * | 3/1997 | Ford et al. | 138/123 |
| 6,284,344 B1 | | 9/2001 | Barnes et al. | 428/98 |
| 6,688,339 B2 | * | 2/2004 | Yamaguchi et al. | 138/129 |
| 2007/0074776 A1 | * | 4/2007 | Masarwa et al. | 138/124 |

FOREIGN PATENT DOCUMENTS

WO 2006/047376 5/2006

OTHER PUBLICATIONS

International Search Report dated Apr. 9, 2009 issued in corresponding Internaional Application No. PCT/IL2008/001209.

* cited by examiner

*Primary Examiner* — Patrick F Brinson
(74) *Attorney, Agent, or Firm* — Womble Carlyle

(57) ABSTRACT

A pipe having a wall formed from a cross-laminated film, and a method of making such a pipe. The film is formed of first and second layers having respective first and second orientation directions, wherein an angle between each of the first and second orientation directions and a projection of a longitudinal axis of the pipe on the wall is selected to enhance the resistance of the pipe to circumferential and/or longitudinal strain due to internal fluid pressure. The angle between each of the first and second orientation directions and a projection of the axis on the wall may be substantially equal to the neutral bias angle. In some cases, the angle between each of the first and second orientation directions and the projection of the axis on the wall may be substantially equal to 59°±2°.

19 Claims, 2 Drawing Sheets

CROSS-LAMINATED PIPE AND METHOD OF MANUFACTURING SAME

CROSS-REFERENCE TO RELATED APPLICATION

This application is a continuation in part of, and claims priority to British Patent Application No. GB 0717679.5, filed Sep. 12, 2007.

FIELD

The invention relates to pipes for transporting liquids, and methods of making such pipes.

BACKGROUND

Flexible pipes for transporting liquids that are reinforced with braided fibers are known and are used for such varied purposes as fire hoses, hydraulic hoses and irrigation pipes. The pipes generally have a multilayer construction in which a preformed pipe body comprising a flexible substrate material such as a suitable polymer, is bonded to at least one layer of fabric or layer comprising a mesh of natural or artificial fibers. The fibers typically comprise at least two sets of fibers with a first set of fibers oriented at a first angle with respect to the pipe axis and crisscrossing over a second set of fibers oriented at a second angle with respect to the pipe axis. The angle at which a set of fibers is oriented with respect to the pipe axis is conventionally referred to as a "bias angle".

The reinforcing fibers provide the pipes with enhanced tear resistance, durability and generally improved structural integrity and resistance to stress generated by pressure of the liquids the pipes are used to transport. Stresses generated by pressure of liquid on a wall containing the liquid are longitudinal stress, hoop stress and radial stress. Longitudinal stress is parallel to an axis along the length of a pipe and typically causes a pipe to stretch and lengthen. Hoop stress is stress that operates to stretch material in the pipe wall circumferentially relative to the pipe axis. Radial stress operates radially to push the pipe wall outward from the axis.

The number and types of layers and/or sets of fibers in a given pipe and their respective bias angles are configured to provide the pipe with desired ability to withstand the various stresses to which the pipe is expected be subjected in its intended use. For some applications, for example for fire hoses, one set of fibers often has a bias angle equal to about 0° with fibers running lengthwise along the pipe, parallel to the pipe axis. A second set of fibers often has a 90° bias angle with fibers oriented substantially perpendicular to the pipe axis. U.S. Pat. No. 6,217,975 describes a ribbon of material, "extendible sheet member", comprising fibers which generate stresses in the material that cause the ribbon to curl up to form a pipe when the ribbon is unwound from a reel. The patent asserts that the technology for producing the material could be put to use for "cable conduits, water pipes, sewage pipes, drainage and irrigation pipes, . . . ".

For some pipes it is desired that change in length of the pipe generated by changes in pressure of liquid in the pipe be minimized. For such pipes, reinforcing fibers are typically oriented at a bias angle, conventionally referred to as a "neutral bias angle", having magnitude equal to about 54.7°. Typically, the pipe comprises at least one set of fibers oriented at a positive neutral bias angle equal to +54.7° with respect to the pipe axis that crisscrosses over at least one second set of fibers oriented at a negative neutral bias angle equal to −54.7° with respect to the pipe axis. The two fibers in the at least one first set of fibers and at least one second set of fibers crossover at a "crossover" angle of 109.4°.

Whereas any strain in a pipe resulting from liquid pressure stress can be problematic in a given application, for long flexible pipes that are often used for agricultural irrigation, longitudinal stress and resultant longitudinal strain, i.e. elongation, can be particularly bothersome. A total longitudinal strain by which a pipe elongates when subject to a given longitudinal stress is proportional to the length of the pipe. The longer the pipe, the more a total amount by which it lengthens for a given magnitude of longitudinal stress.

Irrigation pipes typically have irrigation accessories such as emitters and/or various fittings in or attached to the pipes, for releasing water from the pipes to plants for which the pipe is used to provide irrigation or for distributing the water to other irrigation pipes, conventionally referred to as "laterals". The pipes and emitters are generally carefully positioned relative to the plants to which the pipes provide water and emission of water via the emitters is generally carefully controlled. For flexible agricultural pipes, lengthening can cause the pipe to "snake" or curl and hamper water flow from the irrigation accessories as well as substantially to displace the irrigation accessories from their intended positions.

SUMMARY

An aspect of some embodiments of the invention relates to providing a pipe for transporting fluids having improved resistance to longitudinal stress generated by pressure of the fluids it carries.

An aspect of some embodiments of the invention relates to providing a method of producing the pipe that is relatively simple and inexpensive.

An aspect of some embodiments of the invention relates to providing material suitable for producing a fluid-carrying pipe that has improved resistance to longitudinal stress.

According to an aspect of some embodiments of the invention, the material comprises a cross-laminated film comprising a first oriented optionally polymer film layer having a first orientation direction optionally laminated to a second optionally polymer film layer having a second orientation direction rotated from the first orientation direction by an angle substantially equal to twice the neutral bias angle.

Cross-laminated films comprising film layers of polymer having crisscrossing orientation directions are typically relatively inexpensive films used to produce relatively low cost products such as plastic bags, packaging films and waterproofing sheets for the building trade. The angles at which the orientation directions of the layers cross are generally configured to provide enhanced tear resistance to the films. For many applications, the cross-laminated films have a crossing angle equal substantially to 90°.

The inventors have noted that a cross-laminated film generally, preferentially resists stretching along orientation directions of the film and features of the film that characterize the orientation directions surprisingly appear to provide the film with structural qualities that are similar to those that would be provided by reinforcing fibers oriented along the orientation directions. As a result, the inventors have determined that cross-laminated films can be configured to have sufficient structural stability so that they can be used to form relatively inexpensive pipes suitable for transporting liquids.

Furthermore, the inventors have determined that if a cross-laminated film, hereinafter a "neutral angle cross-laminate", has a crossing angle substantially equal to twice the neutral bias angle, the film can be formed into a relatively inexpensive pipe for which change in length of the pipe responsive to changes of pressure of a liquid in the pipe is relatively small. In particular, the inventors have determined that a neutral angle cross-laminate, in accordance with an embodiment of the invention, can be used to form an irrigation pipe that exhibits relatively little or substantially no longitudinal strain in response to stress generated by pressure of water in the pipe.

The inventors have also determined that external environmental forces, such as friction between the ground and the outer surface of a pipe formed of cross-laminated films can aid in reducing longitudinal strain resulting from stress generated by pressure of water in the pipe. By taking these forces into account, the crossing angle between the cross-laminated films can be increased from twice the neutral bias angle, without adversely affecting the resistance to longitudinal strain. Increasing the crossing angle yields an improvement in resistance to hoop stress.

BRIEF DESCRIPTION OF FIGURES

Examples illustrative of embodiments of the invention are described below with reference to figures attached hereto. In the figures, identical structures, elements or parts that appear in more than one figure are generally labeled with a same numeral in all the figures in which they appear. Dimensions of components and features shown in the figures are generally chosen for convenience and clarity of presentation and are not necessarily shown to scale. The figures are listed below.

DETAILED DESCRIPTION

Figure 1:
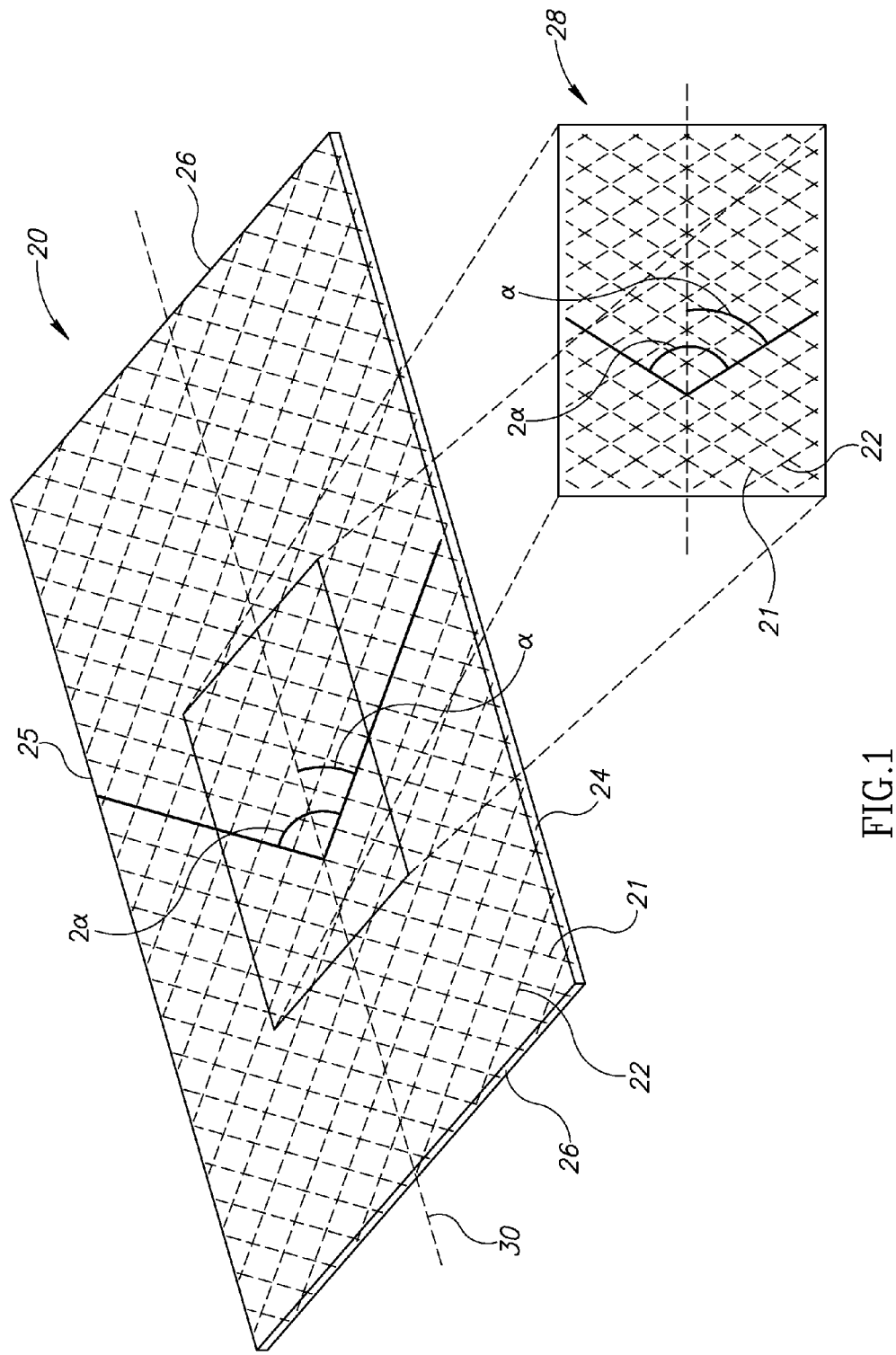
FIG. 1 schematically shows a cross-laminated film, i.e. a neutral angle cross laminate, suitable for forming an irrigation pipe, in accordance with an embodiment of the invention.

FIG. 1 schematically shows a length of a neutral angle cross-laminated film 20 suitable for use in forming a flexible pipe for transporting a fluid, in accordance with an embodiment of the invention.

Film 20 comprises optionally two layers (not individually shown) of oriented material. One of the layers has an orientation direction schematically indicated by dashed lines 21 and the other layer has an orientation direction schematically indicated by lines 22. Each orientation direction 21 and 22 makes an angle α with an axis 30 that passes through regions of film 20 at which lines 21 and 22 cross over so that the orientation directions have a crossover angle equal to 2α. Optionally, film 20 is formed by bonding or suitably welding two layers of oriented material to each other or to a common substrate layer. In some embodiments of the invention, the layers are formed by processing, such as for example stretching and/or heating, an initially single layer of material to create two layers in the film, each characterized by a different orientation direction.

Optionally, the layers comprised in film 20 are formed from an oriented film or a combination of oriented films made from a material or materials suitable for forming an irrigation pipe. Optionally, the material is an oriented polyolefin. Examples of oriented films suitable for use in forming a layer in film 20, in accordance with an embodiment of the invention, are: oriented film of polypropylene; an oriented film of high density polyethylene (HDPE); an oriented low density polyethylene (LDPE) film; an oriented film of high or ultra-high molecular high density PE (HMHDPE/UHMHDPE); and/or a linear low density polyethylene (LLDPE). In addition, each layer may comprise cyclic olefin copolymer (COC), fillers, nano-size particles including nano-clays, pigments, stabilizers, antioxidants, carbon black, and reinforcing particles and fibers. The films and/or oriented materials from which they are made may used alone and/or in a suitable blend to form films, film layers, and/or materials and/or irrigation pipes in accordance with an embodiment of the invention.

During manufacture of the layers, molecule chains therein are oriented and their orientation directions define the orientation directions 21 and 22 of the layers and film 20. Optionally, film 20 is a cross-laminated film similar to an IntePlus® film manufactured by World-Pak, a business division unit of IntePlast Group Ltd or a Valeron film manufactured by Valeron Strength Films, a business unit of Illinois Tool Works Inc.

For convenience of presentation, film 20 is schematically shown as being appropriately cut to form an irrigation pipe in accordance with an embodiment of the invention and has two long edges 24 and 25 and two short edges 26. Long edges 24 and 25 are parallel to axis 30.

Whereas IntePlus® or Valeron films typically have bias angles equal to about 45°, in accordance with an embodiment of the invention, bias angle α in film 20 is determined to be an angle for which longitudinal stress generated by water pressure in an irrigation pipe formed from film 20 generates a relatively small longitudinal strain in the pipe. Optionally, the longitudinal strain in the pipe for fluid pressures between about 0.5 bar and 10 bar typically encountered in agricultural applications is less than about 1.5%. Optionally, the longitudinal strain is less than about 0.5%. Optionally, the longitudinal strain is substantially equal to zero.

In accordance with an embodiment of the invention α has a value between about 50° and 60°. Optionally, α has a value between about 53° and 57°. In accordance with an embodiment of the invention α is substantially equal to the neutral bias angle 54.7° and a cross over angle substantially equal to about 109.4°. For convenience of presentation, film 20 is schematically shown as being appropriately cut to form an irrigation pipe and has two long edges 24 and 25 and two short edges 26. Long edges 24 and 25 are parallel to axis 30.

Figure 2:
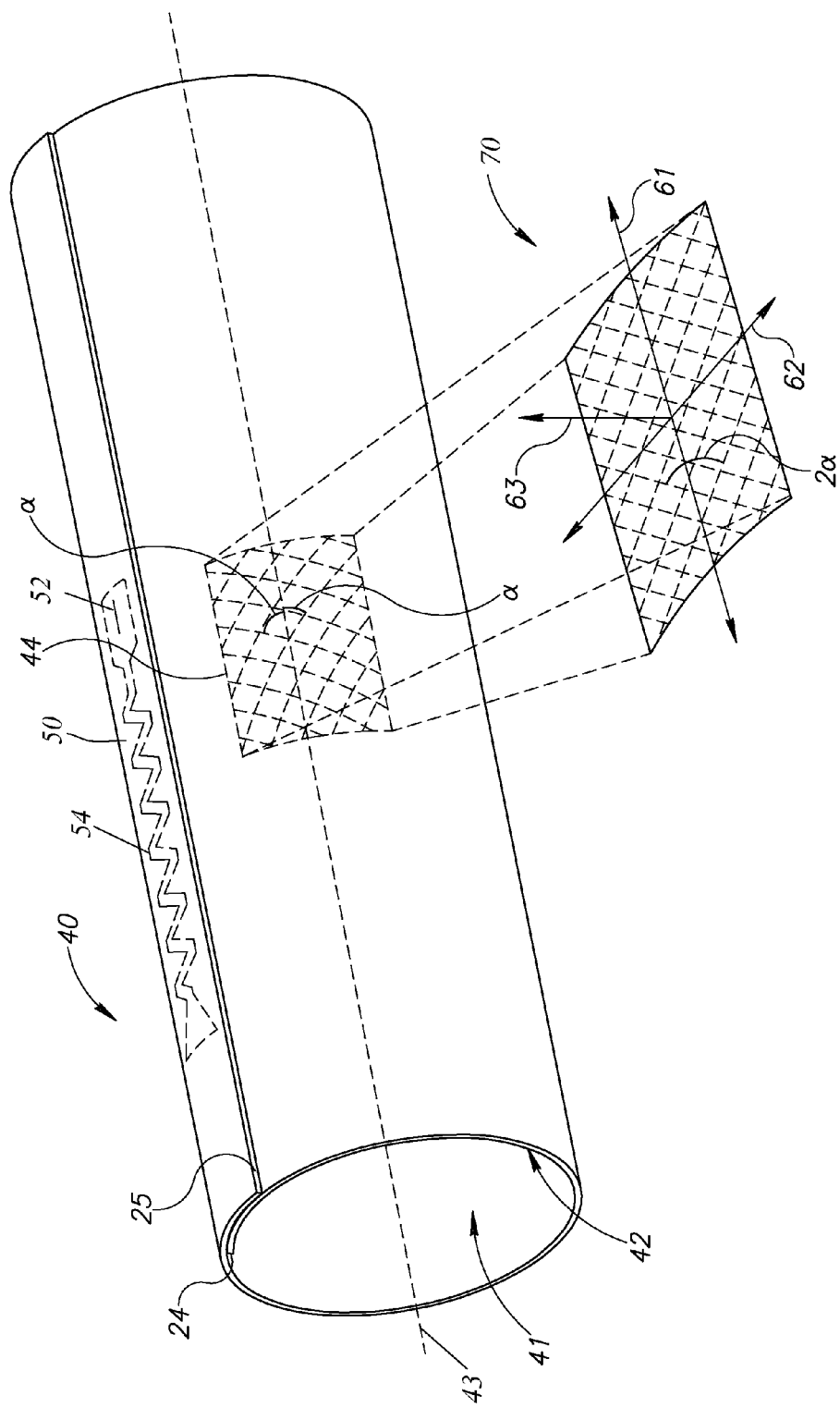
FIG. 2 schematically shows an irrigation pipe formed from a material similar to that shown in FIG. 1, in accordance with an embodiment of the invention.

FIG. 2 schematically shows film 20 rolled up and sealed along edges 24 and 25 to form a wall 42 of an irrigation pipe 40 having a lumen 41 and a pipe axis 43. In accordance with an embodiment of the invention, film 20 is formed so that a projection of axis 43 onto wall 42 is parallel to axis 30 (FIG. 1) of film 20. As a result, relative to axis 43, orientation directions 21 and 22 make a bias angle α with respect to pipe axis 43.

Any of various technologies known in the art may be used to form irrigation pipe 40 from film 20. In FIG. 2, irrigation pipe 40 is formed by folding film 20 onto itself to provide an overlap region bounded by edges 24 and 25 and bonding or welding the edges to the film. Any of various irrigation accessories, such as lateral connectors for connecting lateral pipe branches, sprinklers, anti-drip valves or pressure regulators may be attached to or incorporated into pipe 40 using a method, such as heat welding, bonding or molding, known in the art. By way of example, pipe 40 is optionally formed having inline emitters 50, one of which is schematically shown in dashed lines in FIG. 2. In line emitter 50 is formed having outlet ports 52 from which water and optionally nutrients flowing in the irrigation pipe exit the pipe and are supplied to plants being irrigated using the pipe. Outlet ports 52 are optionally connected to lumen 41 of irrigation pipe 40 by a labyrinth 54.

Optionally, pipe 40 is a lay-flat type pipe which when not in use under fluid pressure has a shape of a generally flat strip (not shown). In agricultural use, such a lay-flat pipe when laid upon the ground of a field exhibits endurance to overriding by wheeled vehicles, which may enter the field between irrigation cycles.

An inset 70 schematically shows a greatly enlarged portion 44 of wall 42. Forces generated by pressure of fluid in pipe 40 that operate on the material of film 20 (FIG. 1) in portion 44 are indicated by vectors 61, 62 and 63. Vectors 61, 62 and 63 schematically represent longitudinal, hoop and radial forces respectively that are generated on wall 42 by pressure of fluid in the pipe. Because, in accordance with an embodiment of the invention, orientation directions 21 and 22 have a bias angle substantially equal to the neutral bias angle relative to axis 43, pipe 40 exhibits relatively little dimensional change when subject to forces 61-63 for the range of water pressures it is expected to experience during irrigation use.

Under some conditions in which pipes used for transporting liquids are used, a crossover angle different from twice the neutral angle can be advantageous. For example, the inventors have determined that contact between a liquid carrying pipe and a surface on which it lies can generate frictional forces that reduce elongation of the pipe responsive to changes in liquid pressure. The inventors carried out a theoretical study of strain exhibited by a pipe formed in accordance with an embodiment of the invention from a film such as film 20 due to fluid pressure changes when the pipe has frictional contact with a surface on which it lies. The study showed that per unit length, a pipe having an angle $\alpha$ of substantially 59° (e.g. 59°±2°) exhibits longitudinal elongation that is reduced due to frictional forces between the pipe and the surface. An angle of substantially 59° also tended to reduce hoop and radial increase in the pipe as a function of increase in liquid pressure. It has been found that increased hoop strain may in some cases harm for example the quality of attachment or bonding of irrigation elements such as connectors (not shown) to the pipe wall.

It is noted that all the above-mentioned ranges and values of $\alpha$ are referenced to the oriented film from which the pipe is made prior to the pipe being stressed by liquid pressure and when laying said film flat. Notably, liquid pressure stress can in some cases cause deformations in the pipe that alter the orientations of the film.

In the description and claims of the application, each of the words "comprise" "include" and "have", and forms thereof, are not necessarily limited to members in a list with which the words may be associated.

The invention has been described using various detailed descriptions of embodiments thereof that are provided by way of example and are not intended to limit the scope of the invention. The described embodiments may comprise different features, not all of which are required in all embodiments of the invention. Some embodiments of the invention utilize only some of the features or possible combinations of the features. Variations of embodiments of the invention that are described and embodiments of the invention comprising different combinations of features noted in the described embodiments will occur to persons with skill in the art. It is intended that the scope of the invention be limited only by the claims and that the claims be interpreted to include all such variations and combinations.

The invention claimed is:

1. A pipe having a longitudinal axis and a wall formed from a cross-laminated film, the cross-laminated film comprising:
    a first layer of a film having a first orientation direction defined by an orientation of molecular chains in the first layer of film, the first orientation direction extending at a non-zero angle $\alpha$ relative to a projection of the longitudinal axis of the pipe onto the pipe wall;
    a second layer of a film having a second orientation direction defined by an orientation of molecular chains in the second layer of film, the second orientation direction extending at a non-zero angle $-\alpha$ relative to the projection of the longitudinal axis of the pipe onto the pipe wall;
    wherein:
    the first and second layers are arranged relative to one another such that a crossover angle of $2\alpha$ is formed between the first orientation direction and the second orientation direction; and
    the first and second orientation directions are selected to enhance the resistance of the pipe to longitudinal strain resulting from internal fluid pressure.

2. A pipe according to claim 1 wherein an angle between the first and second directions is between about 106° and about 114°.

3. A pipe according to claim 1 wherein the crossover angle between the first and second orientation directions is substantially equal to twice the neutral bias angle.

4. A pipe according to claim 1 wherein the first and second orientation directions are selected to take account of friction between an outer wall of the pipe and a surface on which the pipe is intended to rest, whereby resistance to both longitudinal and circumferential strain are enhanced.

5. A pipe according to claim 4 wherein the angle of the first orientation direction relative to the projection of the longitudinal axis of the pipe onto the pipe wall is substantially equal to +59°, and the angle of the second orientation direction relative to the projection of the longitudinal axis of the pipe onto the pipe wall is substantially equal to −59°.

6. A pipe according to claim 1 wherein one of the layers comprises a polymer film.

7. A pipe according to claim 6 wherein the polymer film comprises an oriented polyolefin film.

8. A pipe according to claim 6 wherein the polymer film comprises a material from the group of materials consisting of: oriented high density polyethylene (HDPE); oriented high/ultra-high molecular high density PE (HMHDPE/UHMHDPE); oriented low density polyethylene (LDPE); and/or oriented linear low density polyethylene (LLDPE).

9. A pipe according to claim 1 wherein the angle of the first orientation direction relative to the projection of the longitudinal axis of the pipe onto the pipe wall is substantially equal to +59°, and the angle of the second orientation direction relative to the projection of the longitudinal axis of the pipe onto the pipe wall is substantially equal to −59°.

10. A method of making a pipe that is resistant to longitudinal strain resulting from internal fluid pressure comprising:
    forming a cross-laminated film having an axis and comprising a first layer of a film having a first orientation direction that forms a non-zero angle $\alpha$ with the axis, and a second layer of a film having a second orientation direction that crosses the first orientation direction and forms a non-zero angle $-\alpha$ with the axis to thereby form a crossover angle of $2\alpha$ between the first orientation direction and the second orientation direction; and
    securing opposed axially extending edges of the cross-laminated film together to form a pipe having a pipe wall and a longitudinal axis parallel to the secured edges,
    wherein the first and second orientation directions are selected to enhance the resistance of the pipe to longitudinal strain resulting from internal fluid pressure.

11. A method according to claim 10 wherein the crossover angle between the first and second orientation directions is between about 106° and about 114°.

12. A method according to claim 10 wherein the crossover angle between the first and second orientation directions is substantially equal to twice the neutral bias angle.

13. A method according to claim 10 wherein the first and second orientation directions are selected to take account of friction between an outer wall of the pipe and a surface on which the pipe is intended to rest, whereby resistance to both longitudinal and circumferential strain are enhanced.

14. A method according to claim 13 wherein the angle of the first orientation direction relative to a projection of the longitudinal axis of the pipe onto the pipe wall is substantially equal to +59°, and the angle of the second orientation direction relative to the projection of the longitudinal axis of the pipe onto the pipe wall is substantially equal to −59°.

15. A method according to claim 10 wherein one of the layers comprises a polymer film.

16. A method according to claim 15 wherein the polymer film comprises an oriented polyolefin film.

17. A method according to claim 15 wherein the polymer film comprises a material from the group of materials consisting of: oriented high density polyethylene (HDPE); oriented high/ultra-high molecular high density PE (HMHDPE/UHMHDPE); oriented low density polyethylene (LDPE); and/or oriented linear low density polyethylene (LLDPE).

18. A method in accordance with claim 10, wherein the non-zero angle $\alpha$ is in the range of about 59°±2°.

19. A method of making an irrigation pipe that is resistant to longitudinal strain resulting from internal fluid pressure comprising:
  providing a cross-laminated film having an axis and comprising:
    a first layer of a film having a first orientation direction extending at a non-zero angle $\alpha$ relative to the axis, the first orientation direction being defined by an orientation of molecular chains in the first layer of film, and
    a second layer of a film having a second orientation direction extending at a non-zero angle $\alpha$ relative to the axis, the second orientation direction being defined by an orientation of molecular chains in the second layer of film, wherein:
    the first and second layers are arranged relative to one another such that a crossover angle of $2\alpha$ is formed between the first orientation direction and the second orientation direction; and
  securing opposed edges of the cross-laminated film together to form a pipe having a longitudinal axis parallel to the secured edges, such that magnitudes of angles between the first and second orientation directions of the cross laminate film in the wall and a projection of the longitudinal axis of the pipe on the wall are substantially equal.

* * * * *